US005481572A

United States Patent [19]
Sköld et al.

[11] Patent Number: 5,481,572
[45] Date of Patent: Jan. 2, 1996

[54] METHOD OF AND APPARATUS FOR REDUCING THE COMPLEXITIY OF A DIVERSITY COMBINING AND SEQUENCE ESTIMATION RECEIVER

[75] Inventors: Johan Sköld, Akersberga; Per-Olof Eriksson, Kista, both of Sweden

[73] Assignee: Ericsson Inc., Research Triangle Park, N.C.

[21] Appl. No.: 284,761

[22] Filed: Aug. 2, 1994

[51] Int. Cl.$^6$ .................................. H04B 7/02; H04L 1/02
[52] U.S. Cl. ......................... 375/347; 375/340; 371/43
[58] Field of Search ................................... 375/232, 267, 375/340–341, 347; 371/43

[56] References Cited

U.S. PATENT DOCUMENTS

| | | | |
|---|---|---|---|
| 4,644,562 | 2/1987 | Kavehrad et al. | 375/232 |
| 4,992,798 | 2/1991 | Nozue et al. | 342/362 |
| 5,031,193 | 7/1991 | Atkinson et al. | 375/231 |
| 5,048,059 | 9/1991 | Dent | 375/340 |
| 5,164,961 | 11/1992 | Gudmundson | 375/229 |
| 5,191,598 | 3/1993 | Backstrom et al. | 375/347 |
| 5,202,903 | 4/1993 | Okanone | 375/347 |
| 5,303,263 | 4/1994 | Skoji et al. | 375/229 |

FOREIGN PATENT DOCUMENTS 0543328  11/1992  European Pat. Off. .

OTHER PUBLICATIONS

J. H. Winters, "Signal acquisition and tracking with adaptive arrays in the digital mobile radio system IS–54 with flat fading," *IEEE Trans. Veh. Technol.*, vol. 42, pp. 377–384, Nov. 1993.

A. P. Clark and S. Hariharan, "Adaptive channel estimator for an HF radio link," *IEEE Trans. Commun.*, vol. 37, pp. 918–926, Sep. 1989.

G. D'Aria, R. Piermarini and V. Zingarelli, "Fast adaptive equalizers for narrow–band TDMA mobile radio," *IEEE Trans. Veh. Technol.*, vol. 40, pp. 392–404, May 1991.

Forney, "The Viterbi Algorithm," *Proc. IEEE*, vol. 61, pp. 286–296, Mar. 1973.

J. H. Winters, "Optimum Combining in Digital Mobile Radio with Cochannel Interference," *IEEE J. Sel. Areas Commun.*, vol. SAC–2, pp. 528–539, Jul. 1984.

J. H. Winters, "Optimum Combining in Digital Mobile Radio with Cochannel Interference," *Trans. Veh. Technol.*, vol. VT–33, pp. 144–155, Aug. 1984.

J. H. Winters, "On the Capacity of Radio Communication Systems with Diversity in a Rayleigh Fading Environment," *IEEE J. Sel. Areas Commun.*, vol. SAC–5, pp. 871–878, Jun. 1987.

J. H. Winters, "Optimum Combining for Indoor Radio Systems with Multiple Users," *IEEE Trans. Commun.*, vol. COM–35, pp. 1222–1230, Nov. 1987.

P. Balaban and J. Salz, "Dual Diversity Combining and Equalization in Digital Cellular Mobile Radio," *IEEE Trans. Veh. Technol.*, vol. 40, pp. 342–354, May 1991.

(List continued on next page.)

*Primary Examiner*—Young Tse
*Attorney, Agent, or Firm*—Eric L. Stasik

[57] ABSTRACT

Signals in synchronizing sequences and data sequences are transmitted over a fading channel to a sequence estimation receiver. The signals are received by a plurality of mutually separated antennas and sampled to produce received antenna signals ($S_{in,r}(k)$). Using the received antenna signals, part transmission channel estimates ($h_{est,r}$) are formed for each antenna. These part channel estimates are used to form precomputed metric values ($f_{a,r}((\Delta T_{ij}), g_a(\Delta T_{ij}))$). For the sequence estimation algorithm, branch metric values ($m(\Delta T_{ij}, k)$) are formed by combining the precomputed metric values with the received antenna signals for state transitions ($\Delta T_{ij}$). For one state transition there is formed a metric value such as the sum of a metric value ($M(T_j, k-1)$) for an old state ($T_j$) at a preceeding sampling time point (k-1) with a branch metric value ($m(\Delta T_{ij}, k)$). Corresponding metric values are formed for all state transitions to the new state ($T_i$) and the state corresponding to the smallest of these metric values is chosen in accordance with the sequence estimation algorithm.

12 Claims, 7 Drawing Sheets

OTHER PUBLICATIONS

S. A. Hanna, M. El–Tanany, and S. A. Mahmoud, "An Adaptive Combiner for Co–Channel Interference Reduction in Multi–User Indoor Radio Systems," *Proc. IEEE Veh. Technol. Conf.*, St. Louis, Mo., May 19–22, 1991, pp. 222–227.

J. H. WInters, J. Salz, and R. D. Gitlin, "The Capacity Increase of Wireless Communication Systems with Antenna Diversity," *Proc. 1992 Conf. Inform. Sciences Syst.*, vol. II, Princeton, N.J., Mar. 18–20, 1992, pp. 853–858.

P. Balaban and J. Salz, "Optimum Diversity Combining and Equalization in Digital Data Transmission with Applications to Cellular Mobile Radio–Part I: Theoretical Considerations," *IEEE Trans. Commun.*, vol. 40, pp. 885–894.

J. H. Winters, J. Salz, and R. D. Gitlin, "The Capacity of Wireless Communication Systems Can Be Substantially Increased by the Use of Antenna Diversity," *1st Intl. Conf. on Universal Personal Communications (ICUPC '92)*, Sep. 29–Oct. 2, 1992, Dallas, Tex., pp. 02.01.1–02.01.5.

M. V. Clark, L. J. Greenstein, W. K. Kennedy, and M. Shafi, "Optimum Linear Diversity Receivers in Digital Cellular Radio," *Proc. Third International Symposium on Personal, Indoor, and Mobile Radio Communicatons*, Boston, Mass., Oct. 19–21, 1992.

J. H. Winters, "Signal Acquisition and Tracking with Adaptive Arrays in Wireless Systems," *Proc. 43rd IEEE Veh. Technol. Conf.*, Secaucus, N.J. 1993, pp. 85–88.

J. H. Winters, J. Salz, and R. D. Gitlin, "The Impact of Antenna Diversity on the Capacity of Wireless Communication Systems," *IEEE Trans. Commun.*, vol. 42, pp. 1740–1751, Feb./Mar./Apr. 1994.

D. W. Tufts and A. A. Shah, "Rapid Interference Suppression and Channel Identification for Digital, Multipath Wireless Channels," *Proc. 44th IEEE Veh. Technol. Conf.*, Stockholm, Sweden, Jun. 7–10, 1994, pp. 1241–1245.

S. Simanapalli, "Adaptive Array Methods for Mobile Communication," *Proc. 44th IEEE Veh. Technol. Conf.* Stockholm, Sweden, Jun. 7–10, 1994, pp. 1503–1506.

W. –H. Sheen and G. L. Stuber, "MLSE Equalization and Decoding for Multipath–Fading Channels," *IEEE Trans. Commun.*, vol. 39, No. 10, Oct. 1991.

Q. Liu and Y. Wan, "An Adaptive Maximum–likelihood Sequence Estimation Receiver With Dual Diversity Combining/Selection," *Int. Symp. on Personal, Indoor and Mobile Radio Commun.*, Boston, Mass., pp. 245–249, Oct. 19–21, 1992.

Q. Liu and Y. Wan, "A Unified MLSE Detection Technique for TDMA Digital Cellular Radio," *43rd IEEE Vehicular Technology Conference*, Secaucus, N.J., pp. 265–268, May 18–20, 1993.

P. Monsen, "Theoretical and Measured Performance of a DFE Modem on a Fading Multipath Channel," *IEEE Trans. Commun.*, vol. COM–25, pp. 1144–1153, Oct. 1977.

P. Monsen, "Feedback Equalization for Fading Dispersive Channels, " *IEEE Trans. Info. Theory*, vol. IT–17, pp. 56–64, Jan. 1981.

P. Monsen, "MMSE Equalization of Interference on Fading Diversity Channels," *IEEE Trans. Commun.*, vol. COM–32, No. 1, pp. 5–12, Jan. 1984.

G. Ungerboeck, "Adaptive Maximum–Likelihood Receiver for Carrier–Modulated Data–Transmission Systems," *IEEE Trans. Commun.*, vol. COM–22, pp. 624–635, May 1974.

W. Van Etten, "Maximum Likelihood Revceiver for Multiple Channel Transmission Systems," *IEEE Trans. Commun.*, vol. COM–24, pp. 276–283, Feb. 1976.

METHOD OF AND APPARATUS FOR REDUCING THE COMPLEXITIY OF A DIVERSITY COMBINING AND SEQUENCE ESTIMATION RECEIVER

RELATED APPLICATIONS

This application is related to U.S. patent application Ser. No. 08/284,775 entitled "Method of and Apparatus for Interference Rejection Combining in multi-Antenna Digital Cellular Communications Systems", by Gregory Bottomley and filed concurrently herewith. This related application is also assigned to the same assignee as the present application and is incorporated herein by reference in its entirety.

FIELD OF THE INVENTION

The present invention relates to diversity combining and equalization in a receiver for digital wireless communications.

BACKGROUND OF THE INVENTION

In wireless digital communications, the radio environment presents many difficulties that impede successful communications. One difficulty is that the transmitted signal may produce multiple reflections which arrive at the receiver with different amplitudes and different phases. The interaction of these reflections, or images, produces variations of the received signal strength at the receiver known as flat fading. If there are a large number of images, flat fading gives rise to a Rayleigh distribution.

A second problem which impedes wireless digital communications is known as time dispersion. Time dispersion occurs when the signal images arrive at the receiver delayed in time with respect to one another. If the time delays are a significant portion of a symbol period, then intersymbol interference (ISI) is produced.

The deleterious effects of Rayleigh fading can be overcome by using diversity at the receiver. One known method of diversity is to use a receiver having two or more mutually separated antennas, for instance as described in *Mobile Communications Design Fundamentals* by William C. Y. Lee, W. Sams and Co., Indiana, USA. In section 3.5.1 of this book several examples are given describing how signals from two receiver antennas can be combined to counteract fading.

Time dispersion can be mitigated by digitally processing the received signals with the aid of an equalizer. Common forms of equalization are provided by linear equalizers, decision-feedback equalizers (DFE), and maximum likelihood sequence estimation (MLSE) equalizers. A linear equalizer attempts to "undo" the effects of the transmission channel by filtering the received signal. A decision feedback equalizer exploits previous signal detections to cancel out the intersymbol interference caused by echoes from these previous signals. Finally, an MLSE equalizer hypothesizes various transmitted signal sequences and applies a model of the disturbed transmission channel to determine which hypothesis best fits the received data. These equalization techniques are well-known to one of ordinary skill in the art and can be found in standard textbooks such as J. G. Proakis, *Digital Communications,* 2nd. Edition, New York: McGraw Hill, 1989.

Of these three equalization methods, MLSE equalization offers the best overall performance. In an MLSE equalizer, all possible signal sequences are hypothesized. For each hypothetical signal sequence, the received signal samples are predicted using a model of the disturbed transmission channel. The difference between the hypothesized received signal and the actual received signal, referred to as the prediction error, gives an indication of how accurate a particular hypothesis is. The squared magnitude of the prediction error is then used as a metric to evaluate each particular hypothesis. The metric is accumulated for different individual hypotheses for use in determining which hypothetical signal sequences are better. This process may, for example, be efficiently realized using the Viterbi algorithm which is a form of dynamic programming.

It is known that the diversity combining process and the equalization process may be combined in some way. Recent research has shown that for MLSE equalization, diversity combining may be done within the equalizer. (See, for example: W. H. Sheen, et al., "MLSE equalization and decoding for multipath fading channels", IEEE Trans. Communications, vol. 39, pp. 1455–1464, Oct., 1991; or Q. Liu, et al., "An adaptive maximum-likelihood sequence estimation receiver with dual diversity combining/selection," Intl. Symp. on Personal, Indoor and Mobile Radio Communications, Boston, Mass., pp. 245–249 Oct. 19–21, 1992; and Q. Liu, et al. "A unified MLSE detection technique for TDMA digital cellular radio", 43rd IEEE Vehicular Technology Conference, Secaucus, N.J., pp. 265–268, May 18–20, 1993.) In the above mentioned research, diversity combining is performed by adding together the magnitude squared prediction errors from different diversity channels when performing metrics.

Further improvement is obtained by scaling the prediction errors from different diversity branches. A detailed description of such an MSLE equalizer is given in U.S. Pat. No. 5,191,598 to Thomas Bäckström, et al. A drawback to the techniques heretofore described is that the previous implementation of a-diversity combining MLSE equalizer involves computing many squared prediction error terms. This can be costly in terms of hardware or software complexity. Thus, there is a need to reduce the complexity of the MLSE equalizer which includes diversity combining.

SUMMARY OF THE INVENTION

The aforementioned problem of efficiently processing signals which are obtained from mutually separated antennas in order to reduce the effects of Rayleigh fading and intersymbol interference is solved in accordance with the present invention.

A method is presented in which a signal representing a transmitted symbol sequence is generated, transmitted, and received on at least two mutually separated antennas. The signal received on each antenna is sampled to form received antenna signals. Using the received antenna signals channel estimates are estimated for each of the antennas which are processed to form precomputed metric values. The precomputed metric values and the received antenna signals are used to form branch metrics which are employed in a sequence estimation algorithm to estimate the transmitted symbol sequence. The sequence estimation algorithm may employ the Viterbi algorithm.

In another embodiment, symbol sequences are generated which are processed with the channel estimates to produce assumed received signals. The assumed received signals are processed to produce precomputed metric values which are used to form branch metrics. The branch metrics are employed in a sequence estimation algorithm to estimate the transmitted symbol sequence.

In yet another embodiment an apparatus for reducing the influence of signal fading and time dispersion in a radio communication system is presented which comprises transmitter means for generating and transmitting a signal representing a transmitted symbol sequence and a receiver for receiving the signal on at least two mutually separated antennas. The signal received from each antenna is coupled to an analog to digital convertor which samples the signal to form received antenna signals. The received antenna signals are coupled to a channel estimator which determines channel estimates for each of the antennas. The channel estimates are coupled to a processor which forms precomputed metric values which are combined with the received antenna signals to produce branch metrics. The branch metrics are coupled to an analyzer which employs the branch metrics in a sequence estimation algorithm for estimating the transmitted symbol sequence.

In still a further embodiment, the apparatus includes a symbol sequence generator for generating symbol sequences which are processed with the channel estimates to produce assumed received signals. The assumed received signals are coupled to a branch metric processor which forms precomputed metric values which are combined with the received antenna signals to produce branch metrics. The branch metrics are coupled to an analyzer which employs the branch metrics in a sequence estimation algorithm for estimating the transmitted symbol sequence.

These and other features and advantages of the present invention will be readily apparent to one of ordinary skill in the art from the following written description when read in conjunction with the drawings in which like reference numerals refer to like elements.

BRIEF DESCRIPTION OF THE DRAWINGS

An exemplifying embodiment of the invention will now be described in more detail with reference to the accompanying drawings, in which.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
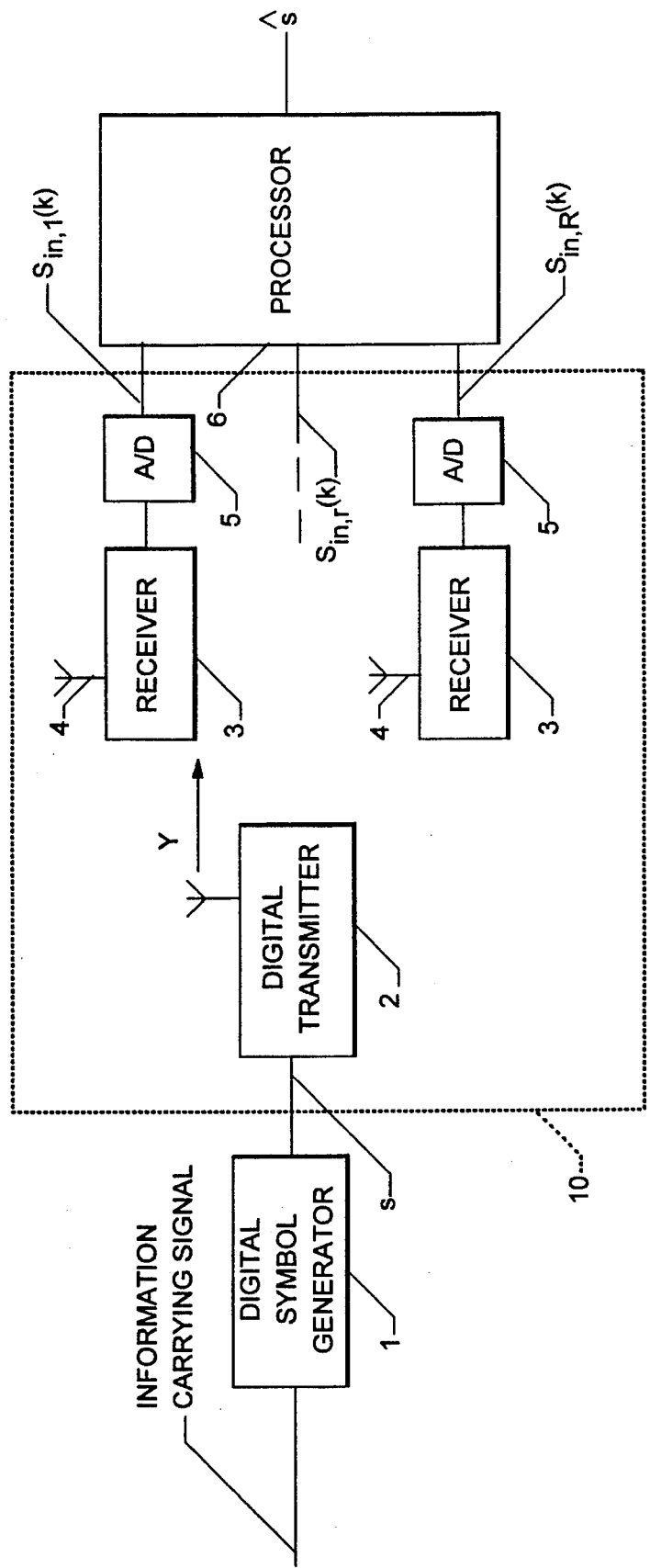
FIG. 1 illustrates schematically a radio transmission system comprising a transmitter, a diversity receiver and an intermediate disturbed transmission channel.

A block diagram for a radio transmission system used in a time-shared radio communication system is illustrated schematically in FIG. 1. A transmitter has a digital symbol generator 1 which receives an information carrying signal and generates corresponding digital symbols s. These symbols are subjected to digital-to-analog (D/A) conversion, modulation, filtering and amplification by digital transmitter 2 and are transmitted as an analog signal Y, in accordance with known techniques. The signal Y is transmitted through a disturbed transmission channel and intercepted by a diversity receiver having receiving units 3 which are R in number. Each of the receiving units has an antenna 4 and is connected to a respective analog-to-digital (A/D) converter 5. The A/D converters convert the signals received from the antennas 4 to received antenna signals $s_{in,r}(k)$. Analog to digital conversion may be effected, for example, using log-polar signal processing as described in U.S. Pat. No. 5,048,059 to Dent. U.S. Pat. No. 5,048,059 is incorporated herein by reference in its entirety. The reference k identifies a sampling time point with number k, while reference r indicates that the signal arrives from the r:th antenna, $1 < r < R$. The received antenna signals $s_{in,r}(k)$ are sent to processor unit 6 in which the received antenna signals $s_{in,r}(k)$ are processed in accordance with the present invention.

The processor unit 6 includes means to carry out the sequence estimation algorithm, such as the Viterbi-algorithm, and means for estimating a transmission channel function, known also as channel estimates. In order to provide an enabling disclosure, subsequent discussion of the present invention will present as means of example the use of the Viterbi algorithm though, as is obvious to one of ordinary skill in the art, other sequence estimation algorithms can be similarly used. Processing unit 6 produces estimated symbols ŝ which correspond to the digital sym-bols s originally transmitted.

The transmitted signal Y may be disturbed during transmission through the transmission channel by, among other things, fading. The disturbing influence of fading on the estimated symbols is reduced in the receiver by using antenna diversity. This is achieved by the fact that: 1) the antennas 4 are at least two in number, i.e., $R \geq 2$; 2) the antennas 4 are mutually separated from each other by at least some fraction of a wavelength; and 3) the received antenna signals $s_{in,r}(k)$ are processed in accordance with the inventive method in processor 6, as described in more detail herebelow.

Figure 2:
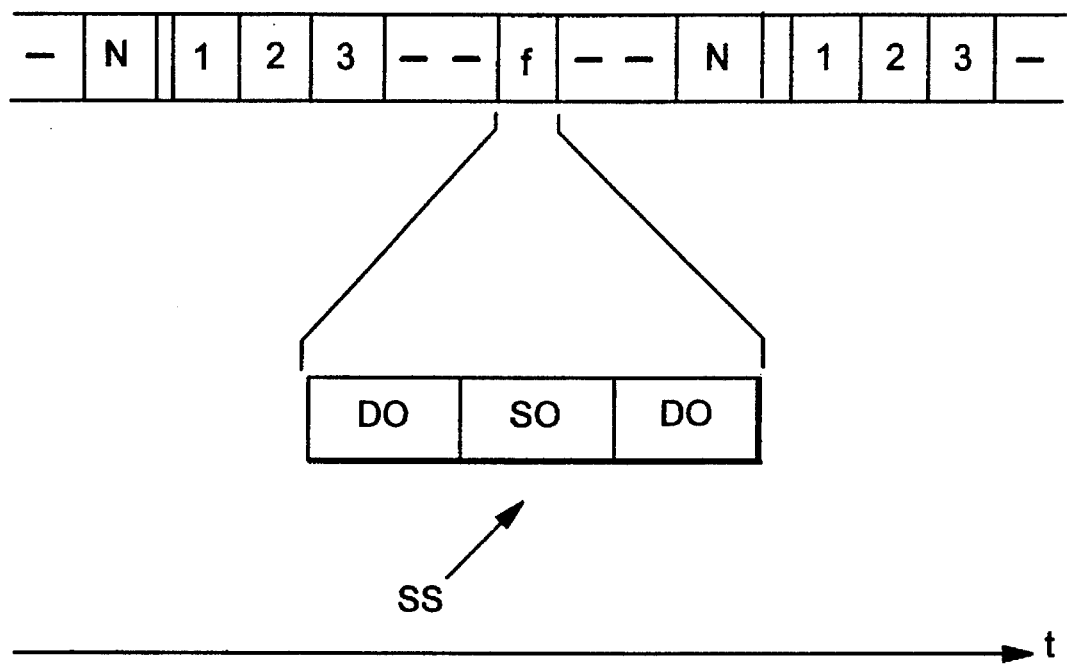
FIG. 2 illustrates time slots for a time shared transmission system, and a time slot signal sequence.
Figure 3:
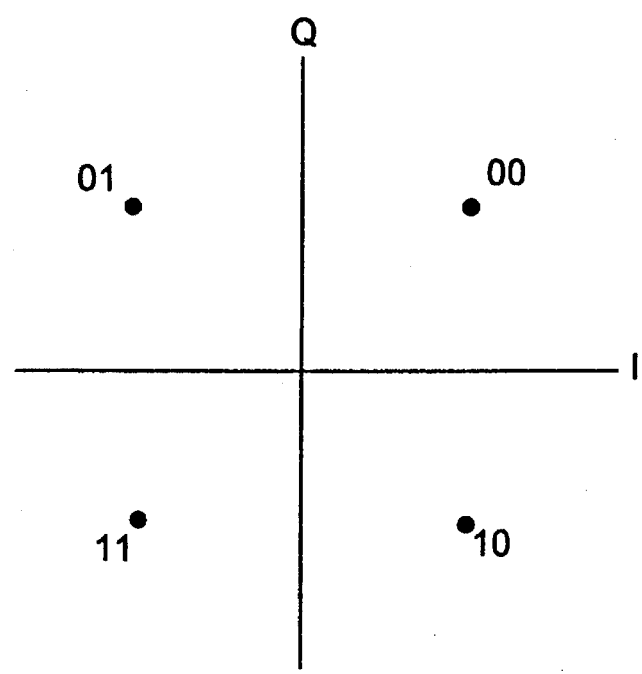
FIG. 3 is a diagram which illustrates the individual values of a transmitted symbol.

The radio transmission system which uses the present invention may, for example, be time-shared with separate time slots 1 through N according to FIG. 2, in which t represents time. Each time slot f may consist of signal sequence SS, which includes a synchronizing sequence SO and a data sequence DO containing the information to be transmitted. The signal sequence SS is comprised of discrete information and may be modulated in accordance with quadrature modulation, for example, as illustrated in FIG. 3. In quadrature modulation, there are four possible values of the modulated symbols which are marked one in each quadrant of the complex numeric plane with the binary numbers 00, 01, 10 or 11. The complex numeric plane has Cartesian axes labeled I and Q representing the in-phase and quadrature-phase signal components. That time taken to transmit one such modulated symbol is designated as the symbol time, or symbol period, TS.

Alternative slot structures to those shown in FIG. 2 are possible. For example, it is possible that the synchronizing sequence SO may be positioned in at one end or the other of the time slot rather than at the center as shown. Also, alternative modulation schemes to that shown in FIG. 3 are possible, including binary modulation, which has constellation points on the I axis only, at +1 and −1. Nonlinear modulation forms, such as GMSK, can be preprocessed at the receiver to appear to have constellation points +1 and −1 such as encountered with binary modulation.

Figure 4:
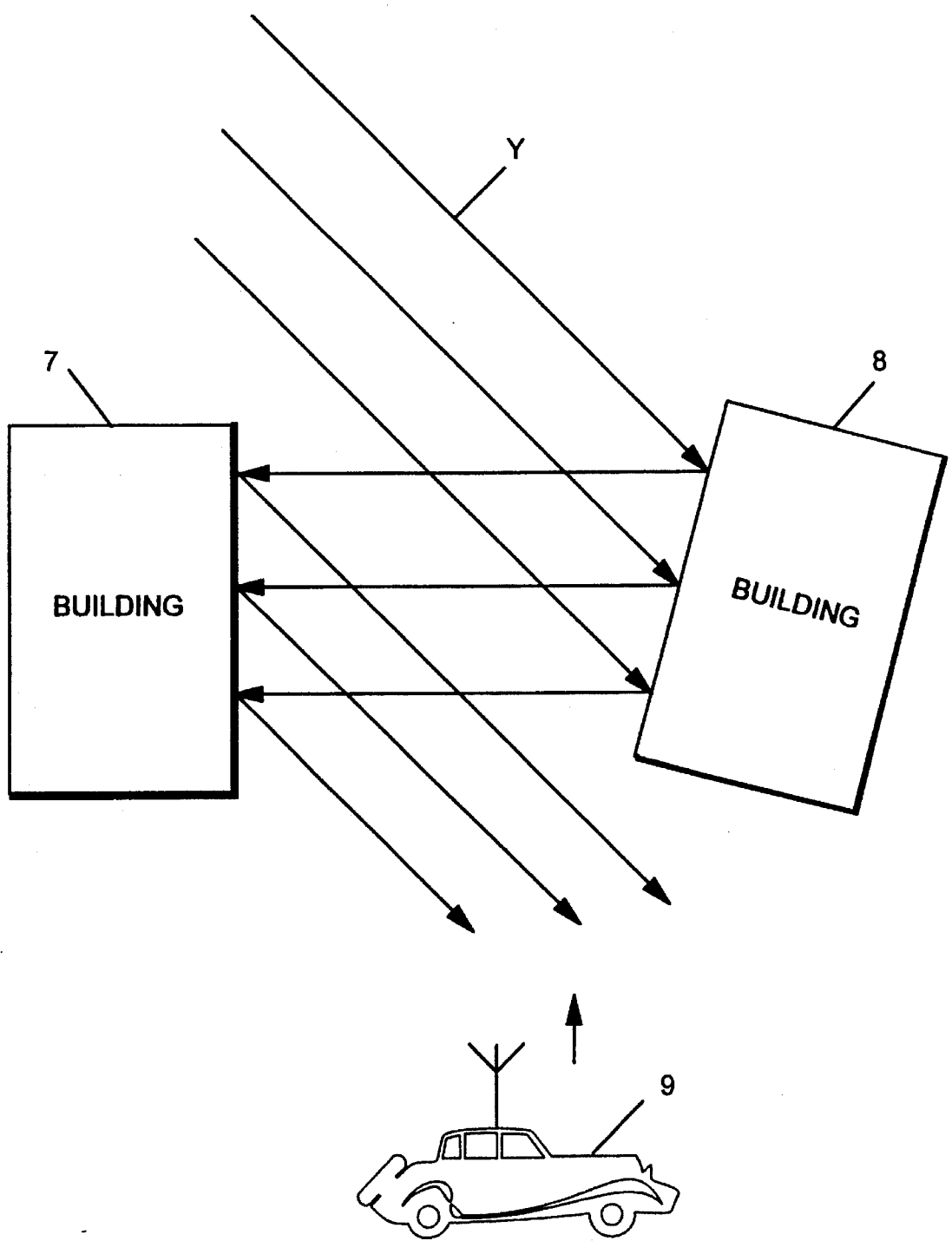
FIG. 4 illustrates a mobile receiver which moves in a signal interference pattern between two buildings.

The aforesaid signal fading, so-called Rayleigh-fading, occurs in the following manner. FIG. 4 illustrates two buildings 7 and 8 which reflect the transmitted signal Y. The reflected signals interfere with one another between the buildings and, as a result of a phase shift, there may occur a regular interference pattern with alternating peaks and nulls of the signal strength. A mobile receiver 9 moving through this interference pattern will repeatedly pass through the nulls where the signal strength is very low. A more exhaustive description of signal fading is given in the aforesaid reference *Mobile Communications Design Fundamentals* by William C. Y. Lee, Chapter 1.

Figure 5:
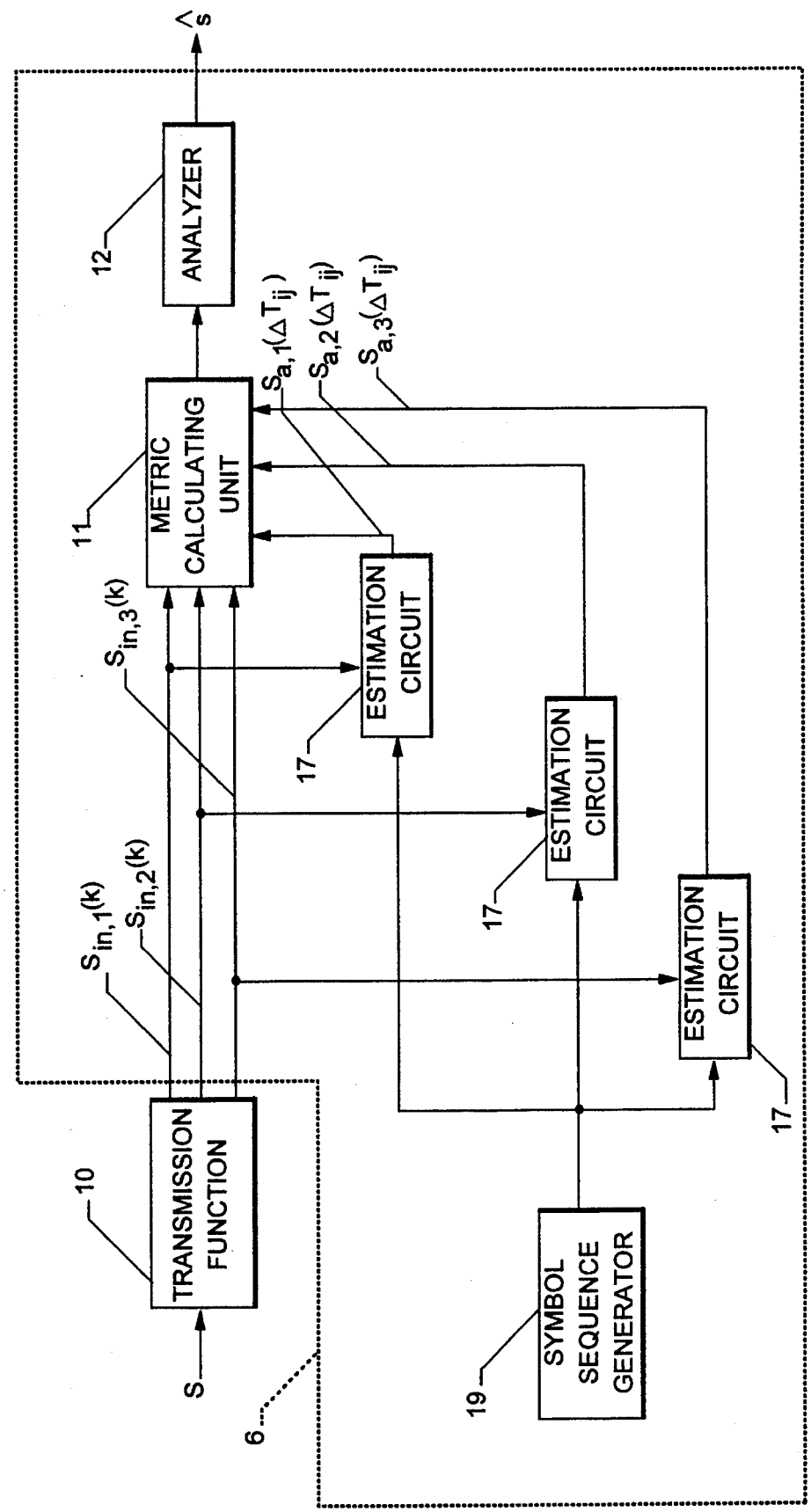
FIG. 5 is a block schematic illustrating a processor which processes signals in accordance with one embodiment of the inventive method.

Processing unit 6 is illustrated in more detail in FIG. 5 where, for the sake of simplicity, the number of antennas R has been restricted to three. FIG. 5 also shows a block 10 which symbolizes a transmission function h for the actual disturbed transmission channel which influences the digital signal s. The transmission function h includes the digital transmitting unit 2, the disturbed transmission channel through which analog signal Y propagates, the receiving units 3 and the A/D converters 5. Processing unit 6 includes a symbol sequence generator 19, estimating circuits 17 for each of the respective antennas 4, a metric calculating unit 11 and an analyzer 12 which effects signal processing in accordance with the Viterbi, or other sequence estimation, algorithm. A part channel estimate $h_{est,r}$ is calculated in each of the estimating circuits 17. Each part channel estimate is calculated in a known manner by comparing, for example, the known synchronizing sequence SO generated by the symbol sequence generator 19 with the received antenna signals $s_{in,r}(k)$ corresponding to the transmitted synchronizing sequence SO which is known a priori. It is assumed in the present embodiment that the part channel estimates $h_{est,r}$ are calculated once with each signal sequence SS, with the aid of the synchronizing sequence SO, and are held constant during the data sequence DO. If, alternatively, the time slots are longer, the channel may vary substantially during the duration of the transmission and the channel estimates may need be updated periodically during the burst. Such channel tracking may require synchronization sequences to be disbursed throughout the slot.

When the data sequence DO is transmitted, the received antenna signals $s_{in,r}(k)$ are obtained for the information transmitted. These signals are analyzed in accordance with, for example, the aforesaid Viterbi-algorithm, which has a number of states $M=V^{D-1}$ where V designates the number of values which a symbol can assume, and D designates the time dispersion for the transmission channel in the number of symbol times TS. For example, with V=4, as in FIG. 3, and D=2, 4 states are needed to carry out the desired processing of the received antenna signals $s_{in,r}(k)$. As another example, with V=2 and D=5, 16 states are needed. A more detailed description of the Viterbi-algorithm is given, for instance, in Proceeding of the IEEE, Vol. 61, No. 3, March 1973, G. D. Forney, Jr.: *The Viterbi Algorithm*.

The present invention takes advantage of the fact that a branch metric associated with a state transition can be expressed in terms of the received antenna signals $s_{in,r}(k)$, which change with sequence index k, and quantities that do not change with index k. These quantities that do not change with k can be precomputed once for each slot, or once for each occurrence of the synchronization sequence SO, and stored in a memory device 15 as pre-calculated values and therefore need not be re-computed. In this case, the expression for the branch metric is given by:

$$m(\Delta T_{ij},k) = \sum_{r=1}^{R} K_r m_r(\Delta T_{ij},k)$$

which is a scaled sum of part metrics, a part metric being expressed as:

$$m_r(\Delta T_{ij},k) = |s_{in,r}(k) - s_{a,r}(\Delta T_{ij})|^2$$

Where $s_{a,r}(\Delta T_{ij})$ are the assumed received signal values and $s_{in,r}(k)$ are the actual received input signal values. The index k designates an indicated sampling time, the index r designates one of the antennas, and $\Delta T_{ij}$ designates the state transitions according to the sequence estimation algorithm. The subscript a in the expression for the predicted input signal values indicates that these are assumed values. The part metric can be expanded to give:

$$m_r(\Delta T_{ij}) = |s_{in,r}(k)|^2 - 2Re\{s_{a,r}*(\Delta T_{ij})s_{in,r}(k)\} + |s_{in,r}(\Delta T_{ij})|^2$$

Observe that the first term, $|s_{in,r}(k)|^2$, is the same for all state transitions, so that it need not be calculated at any time. Since the part metrics are compared to one another, terms common to each are superfluous and unnecessarily contribute to the processing overhead. Substituting this expression for the part metric into the metric expression gives:

$$m(\Delta T_{ij},k) = g_a(\Delta T_{ij}) - 2\sum_{r=1}^{R} Re\{f_{a,r}*(\Delta T_{ij})s_{in,r}(k)\}$$

where:

$$f_{a,r}(\Delta T_{ij}) = K_r s_{a,r}(\Delta T_{ij})$$

and $$g_a(\Delta T_{ij}) = \sum_{r=1}^{R} K_r |s_{a,r}(\Delta T_{ij})|^2$$

are referred to as the precomputed metric values, as they can be calculated once for each time slot, or for each occurrence of a synchronization squence if the channel must be tracked. Other similar forms are possible and anticipated. For example, the −2 in the metric can be made part of the precomputed values.

The precomputed metric values are based on the assumed received signals. These are computed as will now be presented. The symbol sequence generator 19 in FIG. 5 assumes sequences of symbols $S(\Delta T_{ij})$ for a state transition $\Delta T_{ij}$ in the Viterbi-algorithm from an old state $T_j$ to a new state $T_i$. With the aid of the channel estimates $h_{est,r}$, assumed received signals are calculated in accordance with a relationship:

$$s_{a,r}(\Delta T_{ij}) = h_{est,r} * S(\Delta T_{ij})$$

in which the symbol * indicates a convolution.

Figure 6:
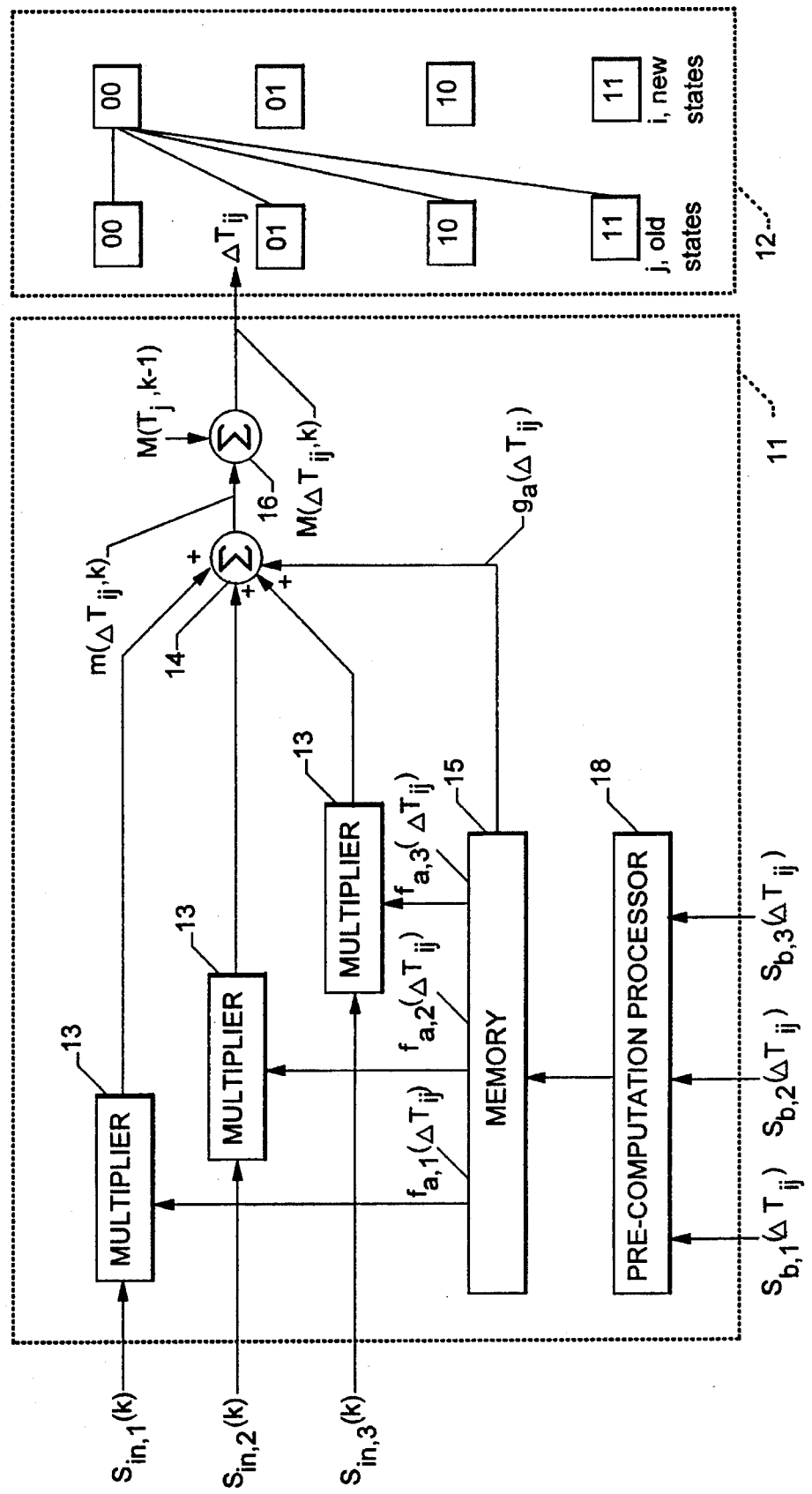
FIG. 6 is a block schematic which illustrates parts of the processor in FIG. 5 in more detail.

The metric computation is shown in FIG. 6. First using the assumed received signals $s_{a,r}(\Delta T_{ij})$, the pre-computation processor 18 calculates the precomputed metric values for use in the entire slot, or for each occurrence of a synchronization sequence if the channel must be tracked. The precomputed metric values are stored in memory device 15.

The sequence estimation algorithm is applied to the sequence of received data. At sequence time k, branch metrics are formed for all possible state transitions $\Delta T_{ij}$. In multipliers 13, a received signal sample is multiplied by the complex conjugate of a precomputed metric value, forming only the real part of that product. In the example of FIG. 6, $s_{in,1}(k)$ is multiplied by the conjugate of $f_{a,1}(\Delta T_{ij})$; $s_{in,2}(k)$ is multiplied by the conjugate of $f_{a,2}(\Delta T_{ij})$, and so forth. The real parts of these products are summed in adder 14, producing the branch metric $m(\Delta T_{ij},k)$. This process is performed for each transition $\Delta T_{ij}$.

The sequence estimation algorithm uses the branch metric values in forming the metrics of the algorithm. In the case of the preferred embodiment, this algorithm has M=4 states designated 00, 01, 10, and 11, having four transitions to each new state, as illustrated in FIG. 6 and thus a total of 16 state transitions or branches. A metric value is calculated for each of these state transitions in accordance with the relationship:

$$M(\Delta T_{ij},k)=M(T_j,k-1)+m(\Delta T_{ij},k)$$

where the summation is performed in adder 16.

In accordance with the sequence estimation algorithm, the value $M(T_j, k-1)$ relates to a selected metric value for the old state $T_j$ at a sampling point k-1 one symbol time TS prior to the indicated sampling point k. The old metric value is increased with the scaled sum of the part metric values in a summator 16. According to the sequence estimation algorithm there is selected the smallest of the metric values at the transition to the new state $T_i$, according to a relationship $$M(T_i,k)=M_jin\{M(\Delta T_{ij},k)\}$$

The metric value $M(T_i,k)$ is thus the value selected for the new state at the indicated sampling time point k. The metric value $M(T_j,k)$ is used in accordance with the Viterbi-algorithm, in order to determine the estimated symbols $\hat{s}$. The metric value is also stored for continued calculation of the metric values at the subsequent sampling time point k+1. If the branch metric is negated, then the Viterbi algorithm selects the largest of the metric values instead.

The coefficients $K_r$ for scaling the part metric values can be selected in various ways. One way is to use the received synchronization symbols and the estimated channel to form estimates of the noise power on each antenna. The reciprocal of these noise powers can be used as the scaling factors.

Figure 7:
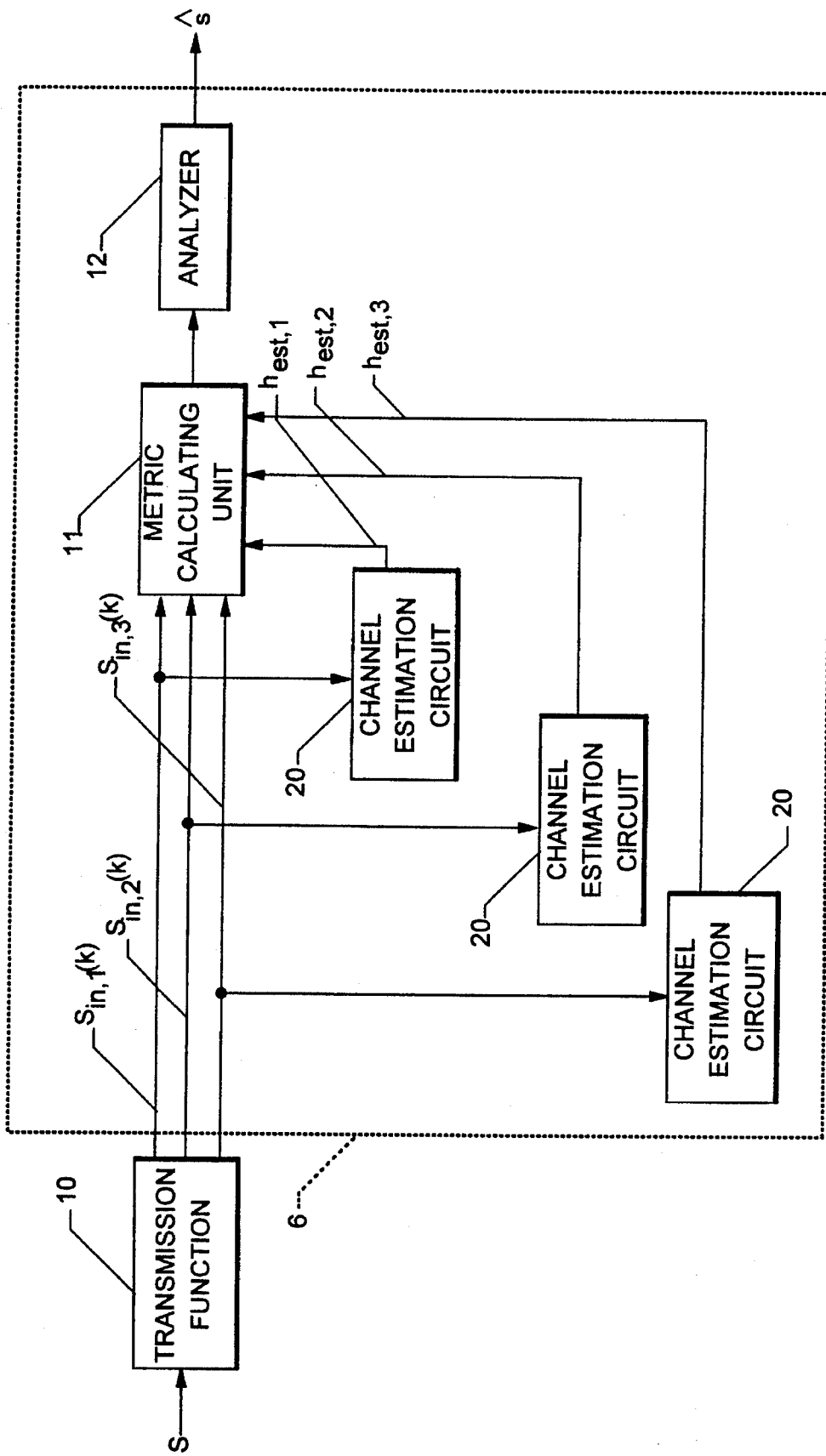
FIG. 7 is a block schematic illustrating a processor which processes signals in accordance a more general embodiment of the inventive method.
Figure 8:
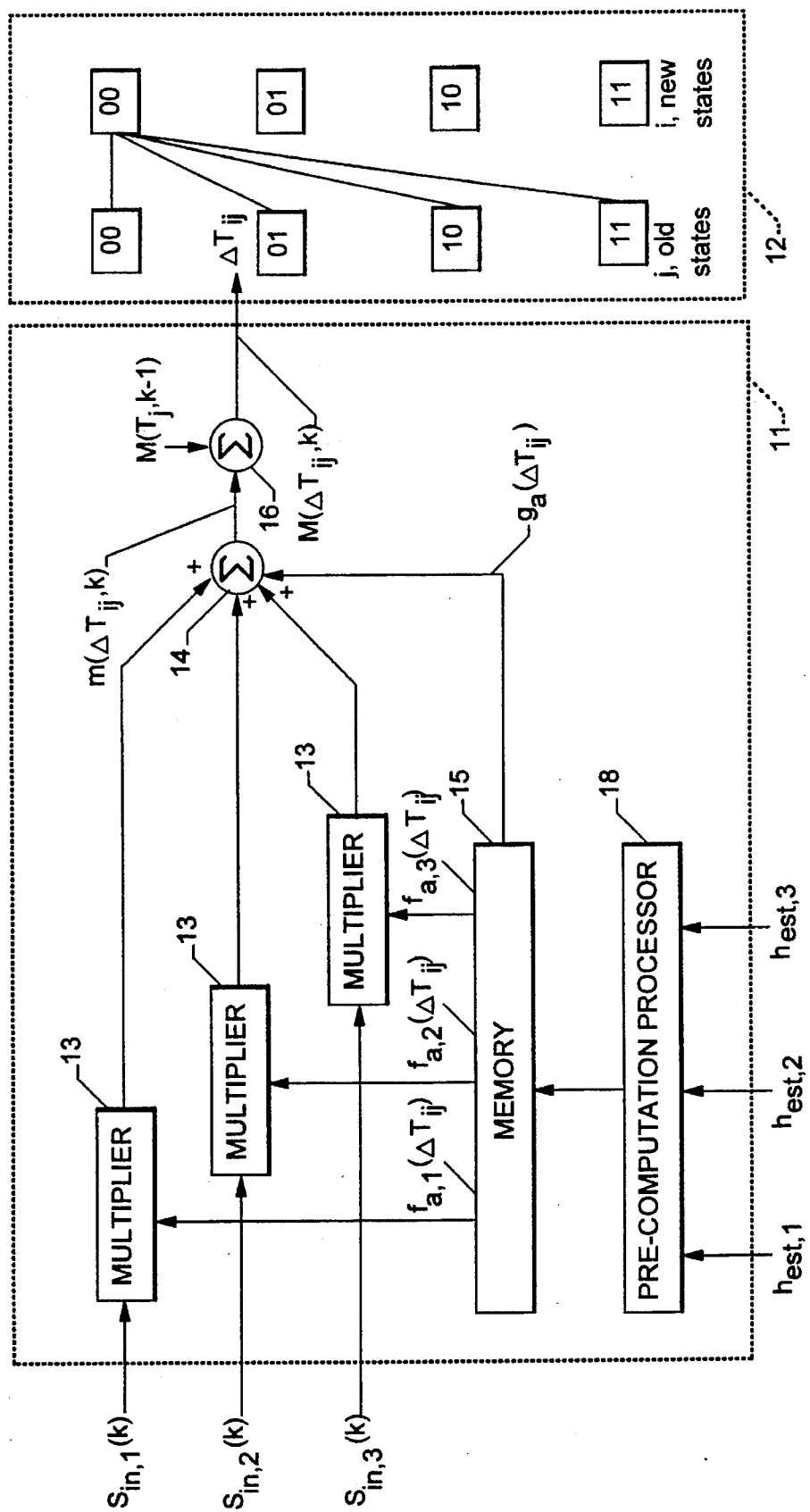
FIG. 8 is a block schematic which illustrates parts of the processor in FIG. 7 in more detail.

A more general embodiment of the present invention is shown in FIG. 7 where the channel estimation circuits 20 pass the channel estimates $h_{est,1}$–$h_{est,3}$ directly to metric calculating unit 11. In this example, the channel estimates are considered static over the burst, but it is anticipated that the channel model may be time varying in which case the updated channel models would be passed to metric calculating unit 11 as shown. FIG. 8 illustrates in greater detail for this embodiment metric calculating unit 11 and analyzer 12. Pre-computation processor 18 receives channel estimates $h_{est,1}$–$h_{est,3}$ and generates precomputed metric values $f_{a,1}(\Delta T_{ij})$–$f_{a,3}(\Delta T_{ij})$ and $g_a(\Delta T_{ij})$ for each state transition which are stored in memory 15. Pre-computation processor 18 may include a symbol sequence generator 19 or, a counter to generate symbol sequences. Alternatively, the precomputation processor may have a parallel architecture which obviates the need for symbol sequence generation. In FIG. 9 is shown a flowchart illustrating the operation of this embodiment.

The invention has been described with reference to a time shared system for radio communication. It is possible, however, to apply the invention also to other systems, for instance systems for frequency shared radio communication and code division multiple access systems. In such systems it is sufficient to transmit a synchronizing sequence used in forming a channel estimate. Should the communications channel change with time, then periodic synchronization sequences would be used or some form of channel tracking would be necessary. In this case, the precomputed metric quantities would apply to groups of data over which the channel estimates can be considered constant.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for reducing the influence of signal fading and time dispersion in a radio communication system, comprising the steps of:

a) generating and transmitting a signal representing a transmitted symbol sequence;

b) receiving the signal on at least two mutually separated antennas;

c) sampling the signals received from the antennas to form received antenna signals;

d) determining channel estimates for each of said antennas using said received antenna signals;

e) processing said channel estimates to form precomputed metric values;

f) forming branch metrics using said precomputed metric values and said received antenna signals; and g) estimating said transmitted symbol sequence using a sequence estimation algorithm employing said branch metrics.

2. The method of claim 1, wherein said sequence estimation algorithm is a Viterbi algorithm.

3. The method of claim 1, wherein said sampling is effected using log-polar signal processing.

4. A method for reducing the influence of signal fading and time dispersion in a radio communication system, comprising the steps of:

a) generating and transmitting a signal representing a transmitted symbol sequence;

b) receiving the signal on at least two mutually separated antennas;

c) sampling the signals received from the antennas to form received antenna signals;

d) determining channel estimates for each of said antennas using said received antenna signals;

e) generating symbol sequences and processing said channel estimates with said symbol sequences to produce assumed received signals;

f) processing said assumed received signals to form precomputed metric values;

g) forming branch metrics using said precomputed metric values and said received antenna signals; and h) estimating said transmitted symbol sequence using a sequence estimation algorithm employing said branch metrics.

5. The method of claim 4, wherein said sequence estimation algorithm is a Viterbi algorithm.

6. The method of claim 4, wherein said sampling is effected using log-polar signal processing.

7. An apparatus for reducing the influence of fading and time dispersion, comprising;

transmitter means for generating and transmitting a signal representing a transmitted symbol sequence;

receiving means for receiving the signal on at least two mutually separated antennas;

analog to digital converter means for sampling the signals received from said antennas to form received antenna signals;

channel estimation means coupled to the received antenna signals for determining channel estimates for each of said antennas using said received antenna signals;

metric calculating means for processing said channel estimates to form precomputed metric values; and analyzer means for estimating said transmitted symbol sequence using a sequence estimation algorithm employing said received antenna signals and said precomputed metric values.

8. The apparatus of claim 7, wherein said sequence estimation algorithm is a Viterbi algorithm.

9. The apparatus of claim 7, wherein said sampling is effected using log-polar signal processing.

10. An apparatus for reducing the influence of signal fading and time dispersion in a radio communication system, comprising:

transmitter means for generating and transmitting a signal representing a transmitted symbol sequence;

receiver means for receiving the signal on at least two mutually separated antennas;

analog to digital conversion means for sampling the signal received from the antennas to form received antenna signals;

channel estimation means coupled to the received antenna signals for determining channel estimates for each of said antennas using said received antenna signals;

symbol sequence generation means for generating symbol sequences and processing said channel estimates with said symbol sequences to produce assumed received signals;

processor means for processing said assumed received signals to form precomputed metric values and forming branch metrics using said precomputed metric values and said received antenna signals; and analyzer means for estimating said transmitted symbol sequences using a sequence estimation algorithm employing said branch metrics.

11. The apparatus of claim 10, wherein said sequence estimation algorithm is a Viterbi algorithm.

12. The apparatus of claim 10, wherein said sampling is effected using log-polar signal processing.

* * * * *